(12) United States Patent
Mistry

(10) Patent No.: US 11,944,234 B2
(45) Date of Patent: Apr. 2, 2024

(54) COOKING APPARATUS

(71) Applicant: Bharatkumar Mistry, Stalybridge (GB)

(72) Inventor: Bharatkumar Mistry, Stalybridge (GB)

(73) Assignee: Bharatkumar Mistry, Stalybridge (GB)

( * ) Notice: Subject to any disclaimer, the term of this patent is extended or adjusted under 35 U.S.C. 154(b) by 414 days.

(21) Appl. No.: 16/929,800

(22) Filed: Jul. 15, 2020

(65) Prior Publication Data

US 2022/0015573 A1 Jan. 20, 2022

(51) Int. Cl.
*A47J 37/04* (2006.01)
*A47J 37/07* (2006.01)
*F23B 60/00* (2006.01)
*F23B 80/04* (2006.01)

(52) U.S. Cl.
CPC ......... *A47J 37/049* (2013.01); *A47J 37/0704* (2013.01); *F23B 60/00* (2013.01); *F23B 80/04* (2013.01)

(58) Field of Classification Search
CPC ..... A47J 37/049; A47J 37/0704; F23B 60/00; F23B 80/04
See application file for complete search history.

(56) References Cited

U.S. PATENT DOCUMENTS

| | | | | |
|---|---|---|---|---|
| 5,896,810 A | * | 4/1999 | Barbour | A47J 43/18 99/421 V |
| 2010/0269713 A1 | * | 10/2010 | Foster | A47J 37/0781 99/482 |
| 2020/0008618 A1 | * | 1/2020 | Seong | F24B 7/005 |

* cited by examiner

*Primary Examiner* — Thor S Campbell
(74) *Attorney, Agent, or Firm* — GableGotwals

(57) ABSTRACT

A cooking apparatus suitable for outdoor use including a substantially ellipsoid or ovoid housing which at least partially defines a cooking area within the same. The housing is substantially formed from aluminium.

15 Claims, 4 Drawing Sheets

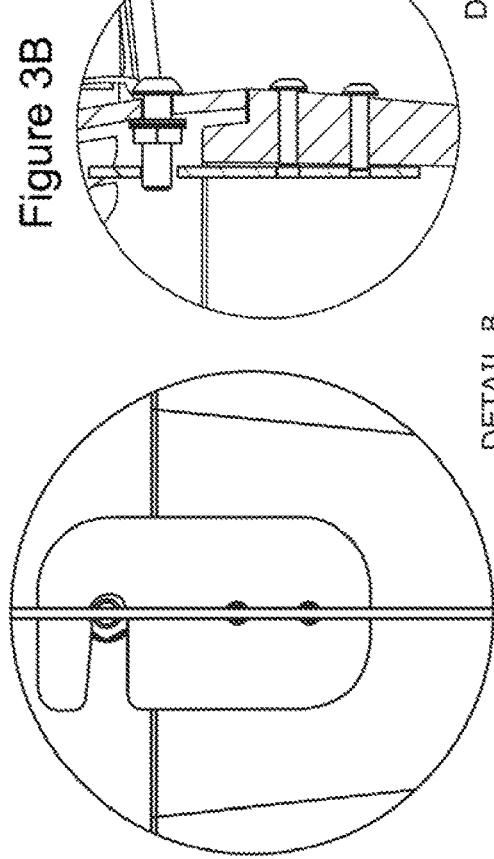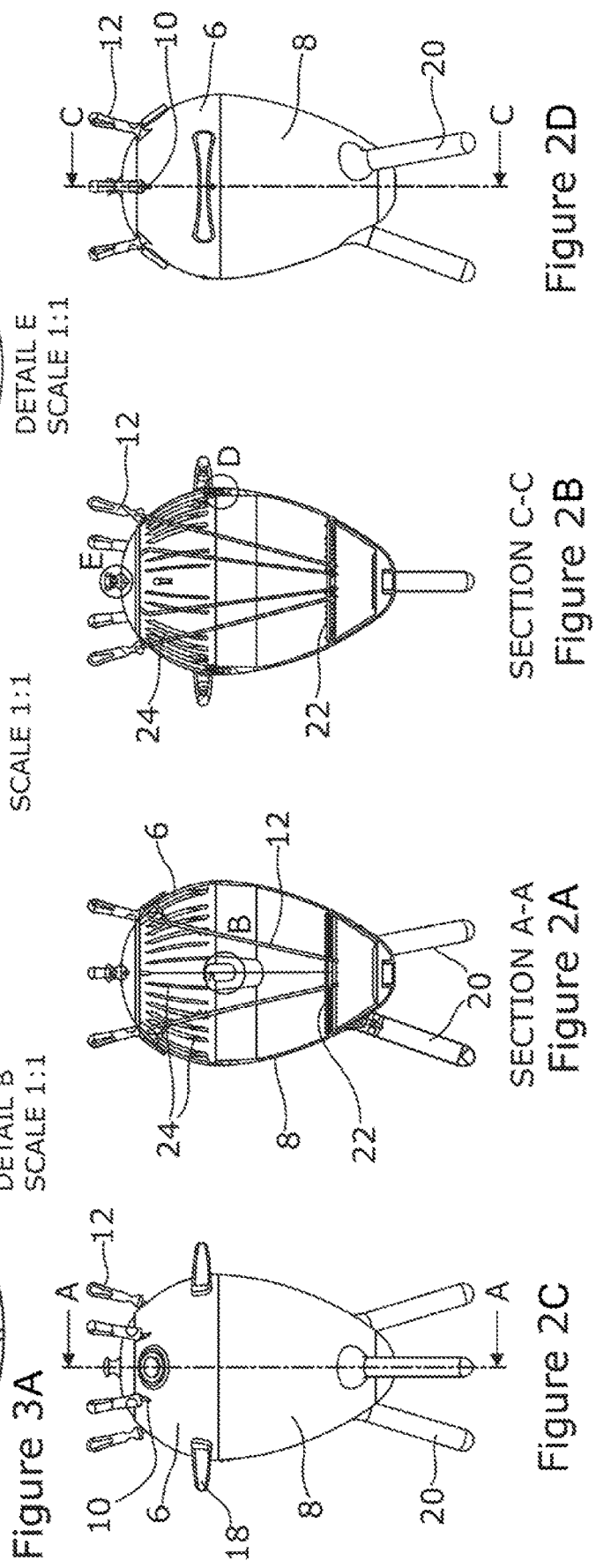

COOKING APPARATUS

BACKGROUND OF THE INVENTION

The invention to which this application relates is an improvement in the apparatus and manner by which food can be cooked in a cooking apparatus or device.

Although the following description refers exclusively to a cooking apparatus for use outdoors, the person skilled in the art will appreciate that the features of the present invention could be applied to cooking apparatus which can be located indoors.

Conventional outdoor cooing apparatus, such as barbeques are well known. Fuel, usually charcoal, is lit in the bottom of the apparatus and food items, such as burgers, sausages etc. are cooked above the burning/smouldering fuel. Some conventional barbeques have selectively closable lids which enable some retention of heat, and cooking similar to an oven, however, conventional barbeques have serious limitations when it food is to be hung and/or cooked vertically in the cooking area or zone as it would be in a tandoor oven or similar. For example in conventional barbeques there is no facility for placing skewers and food items thereon substantially vertically to be cooked.

BRIEF SUMMARY OF THE INVENTION

It is therefore an aim of the present invention to provide a cooking apparatus that addresses the abovementioned problems.

It is a further aim of the invention to provide a method of assembly of a cooking apparatus that addresses the abovementioned problems.

It is a yet further aim of the invention to provide a method of cooking with or using an apparatus that addresses the abovementioned problems.

In a first aspect of the invention there is provided a cooking apparatus suitable for outdoor use, said cooking apparatus including a substantially ellipsoid or ovoid housing which at least partially defines a cooking area within the same, characterised in that the housing is substantially formed from aluminium.

Preferably the housing is located on one or more legs and/or stand members. Further preferably the housing is located on one or more legs and/or stand members such that the longitudinal axis of the apparatus and/or housing is positioned or located substantially on, or aligned with, a substantially vertical axis or plane.

Using aluminium as the housing material provides the optimum balance of mass for heat retention and conduction, whilst making the weight of the whole apparatus practical for consumer use and transport.

In a preferred embodiment of the invention the housing is ovoid. Typically the narrow or pointed end of the ovoid is located substantially at, or towards, the bottom of the apparatus when the longitudinal axis of the same is parallel to and/or aligned on a vertical axis.

In preferred embodiment of the invention the apparatus and/or housing for the same is substantially symmetrical about the longitudinal axis of the same. Typically the longitudinal axis of the apparatus is an axis of symmetry.

In a preferred embodiment the apparatus includes one or more formations for the location and/or attachment of one or more skewers in use.

In one embodiment the formations include one or more hooks and/or projections formed on and/or located substantially in the housing. Typically food items can be placed or hung on said formations. In one embodiment the formations are located on the inside surface of the housing.

In a preferred embodiment the formations include one or more apertures and/or slots formed in the housing, shaped to receive one or more skewers in use. Alternatively, or in addition said formations include slots, apertures, hooks and/or the like formed on and/or through said housing.

Typically the formations are located in the top or substantially towards the top of the housing such that the skewers can depend downwardly towards the bottom of the apparatus in use. Further typically the formations are one or more slots located towards the top of the housing and the skewers include one or more handles. Typically the skewers are linear metal rods, of a length sufficient for one end to rest or be located in the cooking area in use and the other end or handle to depend through said formation or slot in the housing.

Typically, in use, fuel is provided into the bottom of the apparatus housing. Typically the fuel is charcoal.

In one embodiment the apparatus includes a first grid or mesh. Typically the first grid or mesh is located towards the bottom of the apparatus and prevents the fuel from contacting the housing in use. Further typically the first grid or mesh is located substantially in or on a horizontal plane and prevents the fuel from contacting the bottom of the housing in use.

In one embodiment the apparatus includes a second mesh or grid. Typically the second mesh or grid is located above the first mesh or grid in use. Further typically the second mesh or grid includes one or more further formations onto which at least part of the skewers can be located in use. In addition, or alternatively, the second grid or mesh provides a surface to prevent food from falling onto the fuel located below the same in use.

Typically the fuel is sandwiched and/or located between the first and second meshes or grids.

In one embodiment the housing is divided or portioned into at least a head section and a body section. Typically the head section and the body section are engaged together in use at least whilst cooking and/or for storage. Further typically the head section and the body section can be disengaged or detached to allow cleaning, removal of food, addition/removal of fuel and/or the like.

In one embodiment the apparatus includes a lid member. Typically the lid member is located substantially at the top of the housing in order that food and/or skewers can be inserted into the cooking area in use, with minimal loss of heat. Further typically the lid member is located on and/or attached to the head portion.

The lid portion, or removal of the same, defines an opening in the top of the housing. The opening is of sufficient size to be large enough for the skewers and other devices to be lowered into the apparatus cooking area. Further typically the presence of the lid member ensures that the larger head member does not have to be removed to insert food, skewers and the like thus retaining heat.

In a preferred embodiment of the invention at least part of the inside surface of the housing includes one or more rib or baffle members. Typically the rib or baffle members are substantially linear projections depending inwardly into the cooking area. Further typically the rib or baffle members are located on substantially vertical plans.

In a preferred embodiment the rib or baffle members are located substantially towards the top of the housing. Typically the rib or baffle members are located substantially at the top half of the housing. Further typically the rib or baffle members are located on the head portion. The internal rib or baffle portions maximise the heat generated by the fuel by substantially breaking up the air flow and allowing greater movement of heat around at least the top half of the internal area of the apparatus before escaping through any formations though the housing or being conducted through the body of the apparatus.

In a second aspect of the invention there is provided an outdoor cooking apparatus including rib or baffle members.

In a third aspect of the invention there is provided a ovoid outdoor cooking apparatus or oven.

In a further aspect of the invention there is provided a method of manufacturing and/or assembling an outdoor cooking apparatus, said method including the step of moulding or pressing metal material to form the housing of said apparatus.

BRIEF DESCRIPTION OF THE DRAWINGS

Specific embodiments of the inventions are now described with reference to the following figures:

FIGS. 2A to 2D show cross sectional views of the apparatus in accordance with one embodiment of the invention;

FIGS. 3A to 3C illustrate the various means by which the apparatus is assembled or attached together in accordance with one embodiment of the invention.

DETAILED DESCRIPTION OF THE INVENTION

Figure 1:
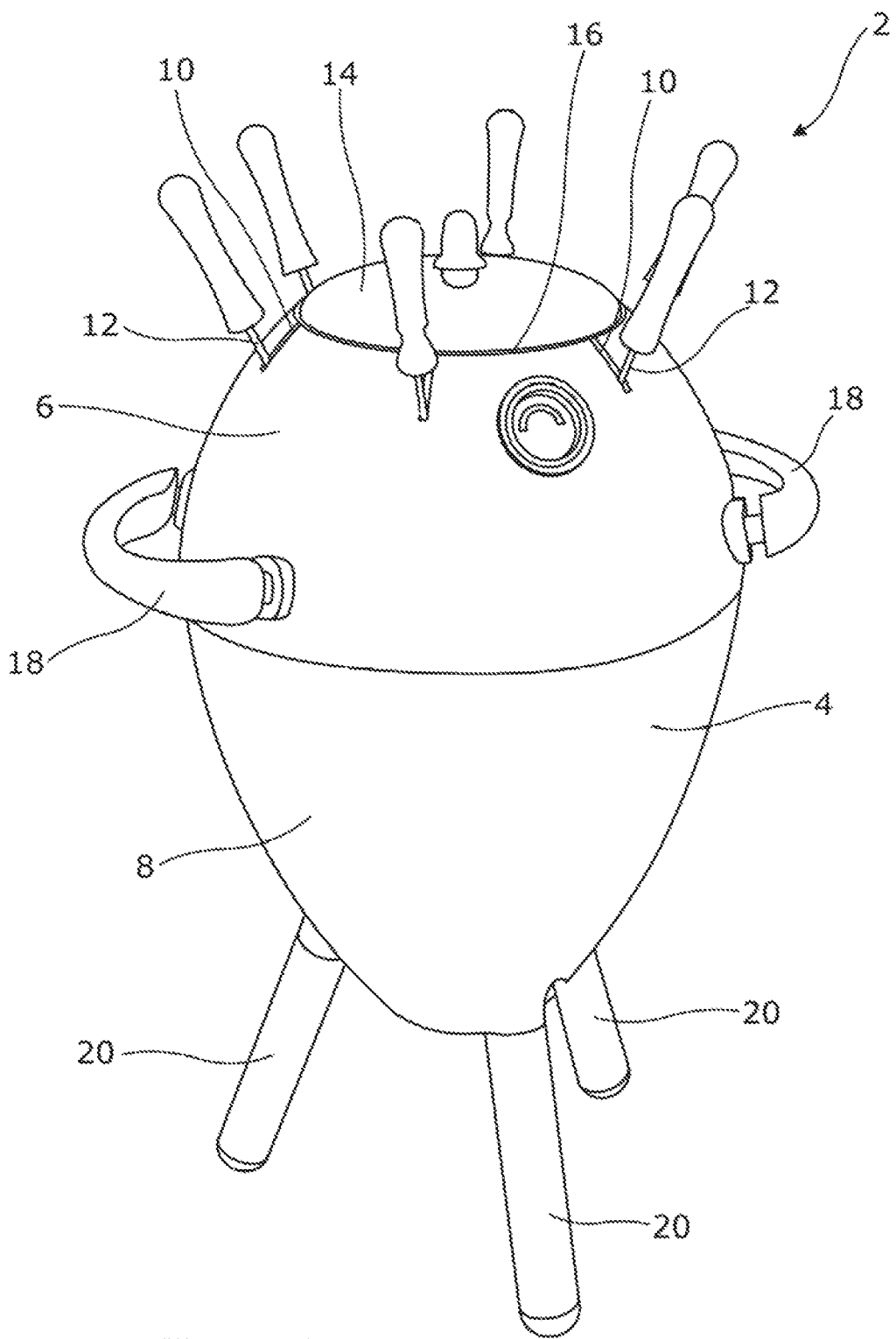
FIGS. 1 and 2 show external views of a cooking apparatus in accordance with one embodiment of the invention.
Figure 2:
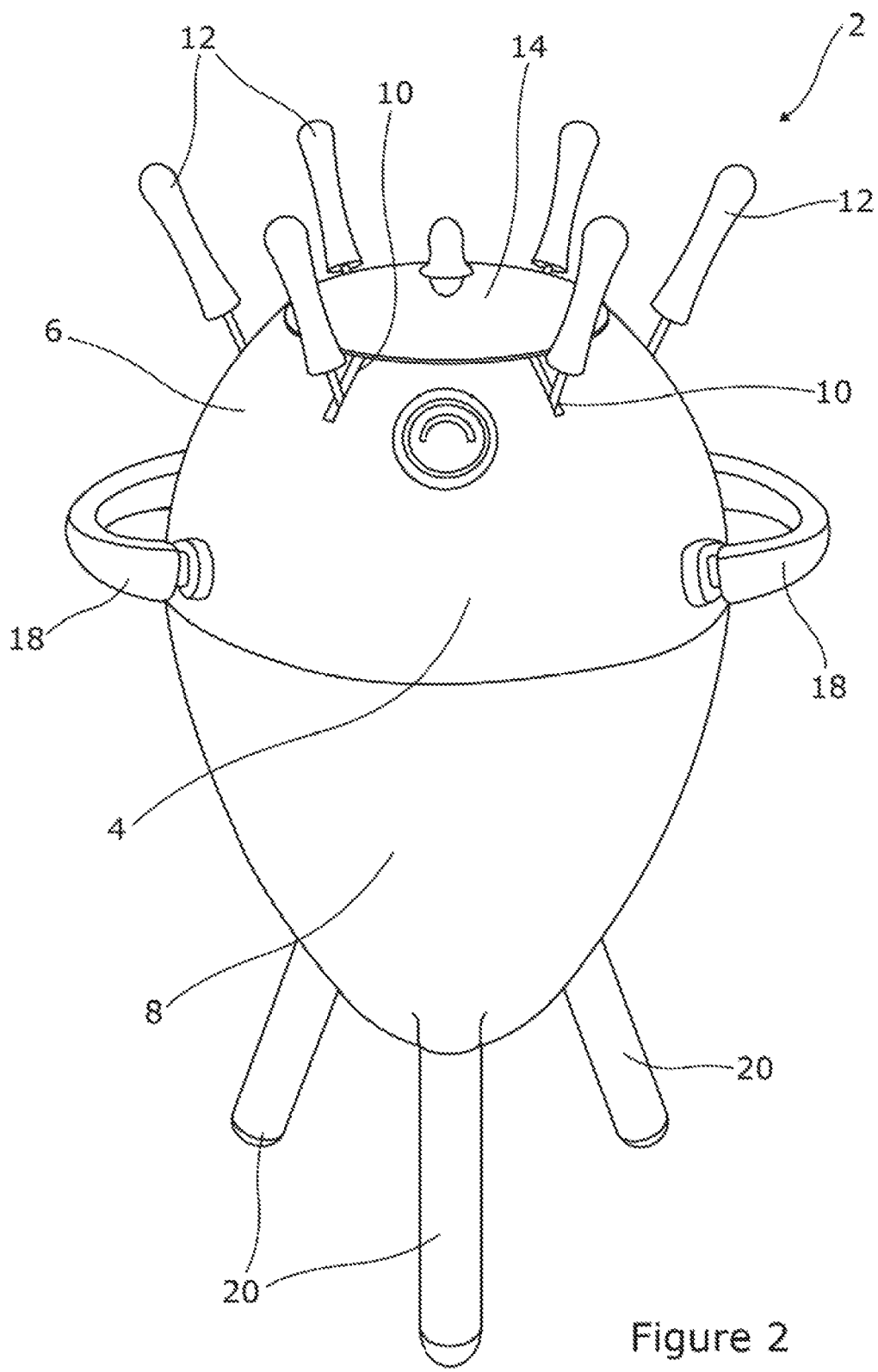

FIGS. 1 and 2 show an outdoor cooking device 2 which is egg or ovoid shaped, the shell of body 4 is constructed primarily from aluminium. Using aluminium has provided the optimum balance of mass for heat retention and conduction over weight to make the whole unit practical for consumer use. Ceramic outdoor cooking products like traditional Indian tandoors are very heavy (for example 70 kg for a similar size unit to the embodiment depicted here which is 15 kg).

The body 4 is divided circumferentially into a head portion 6 and a body portion 8. The head portion 6 and the body portion 8 are attached together by hook or latch means as depicted in FIG. 3A.

The head portion 6 includes a number of equidistantly and circumferentially spaced notch or slot formations 10 which are adapted to receive skewers 12. Food items, typically meats such as chicken and lamb etc., can be hung on the skewers and then placed into a cooking area inside the housing 4. Once inside the food items are cooked, or at least warmed, over fuel (not shown). The fuel is typically charcoal or similar, and located in the bottom of the housing.

To insert the food, rather than detaching the head portion 6 from the body, 8, the device 2 includes a lid 14 which covers an opening 16 in the top of the device through which food items and/or skewers can be inserted and/or removed in use. The opening 16 has been designed to be large enough for skewers and other devices to be lowered into the cooking area, which can hold whole chickens and lamb legs. This means that the whole upper half doesn't have to be 'opened' which would drastically compromise heat retention. Furthermore the egg shape from the testing has proved to be a perfect shape that provides maximum functional usage when using skewers. It maximises the cooking area in the top half chamber whilst providing enough air flow around the food to cook the food evenly. The ovoid shape also gives sufficient separation between the food and the charcoal level so that the food is not too close to burn. It also enable 'fatty' foods to be placed high enough above the charcoal so that by the fat drips onto the hot charcoal it is sufficiently diffused to not flame and char the food.

The head portion 6 also includes a pair of handles 18 so that the head portion 6 can be removed from the body portion 8 to facilitate cleaning, insertion/removal of fuel etc. The device 2 can be placed on legs or a stand. In this embodiment three equally spaced legs 20 are used to keep the longitudinal axis of the device substantially vertical, with the narrow end of the oval at the bottom.

Turning now to the cross sectional FIGS. 2A and 2B which show the typical location of the skewers 12 through the slots 10 formed in the housing 4. Once inserted into the slots the skewers 12 dependent downwardly through the cooking area inside the body and the ends of the skewers are located on a plate 22 or mesh grid positioned above the bottom area of the body 8 in which the charcoal is usually situated.

Figure 4A:
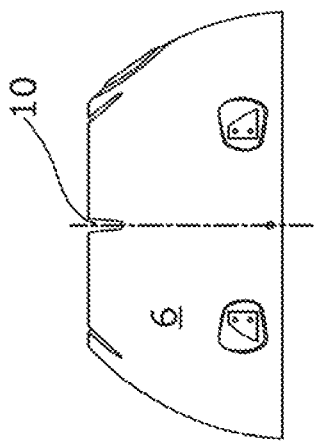
FIGS. 4A to 4F illustrate a configuration of the head section in accordance with one embodiment of the invention.
Figure 4C:
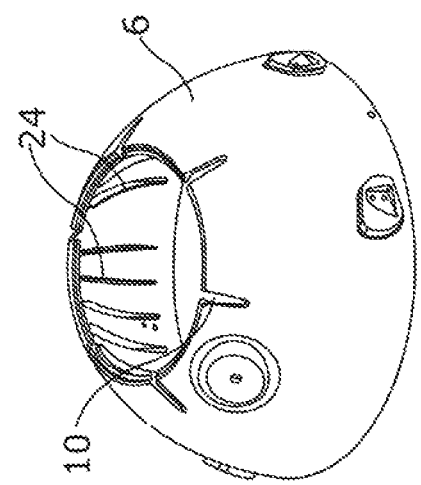
Figure 4B:
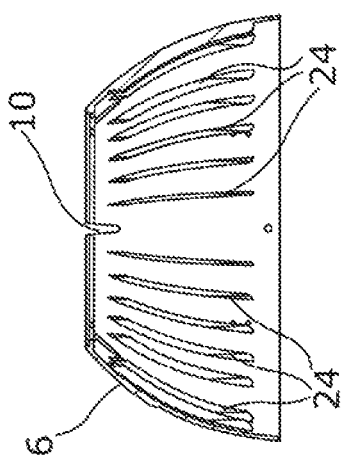
Figure 4E:
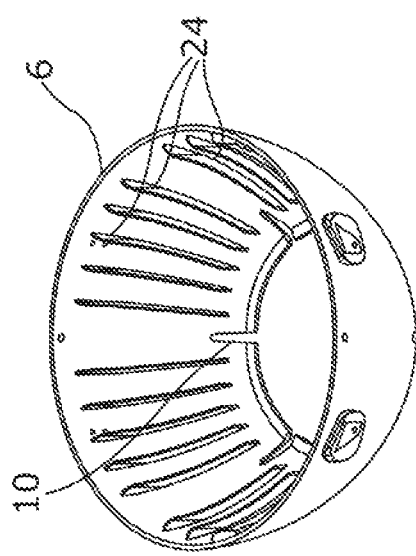
Figure 4D:
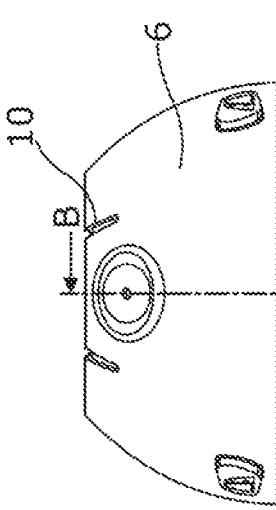
Figure 4F:
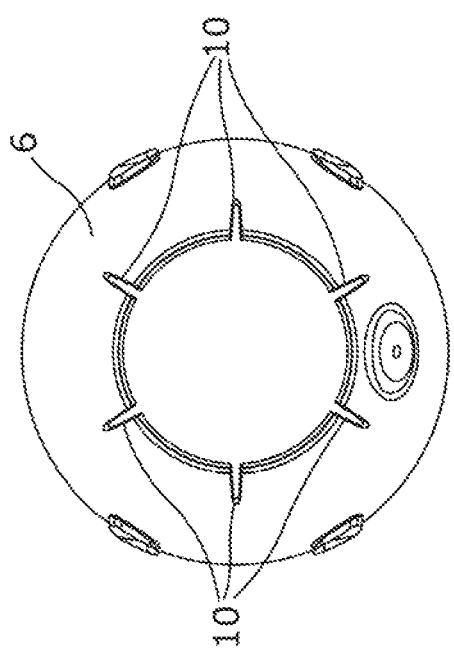

FIGS. 2A and 2B, as well as FIGS. 4A-4F also show the location of a number of rib or baffle portions 24 which, in this embodiment, are located on the inside surface of the head portion 6. FIGS. 4B and 4F show the shape and configuration of these linear baffles or ribs 24. The internal ribs 24 in the head portion 6 of the body 4 maximise the heat generated by the charcoal fuel by: a) Breaking up the airflow and allowing greater movement of heat around the top half before escaping through the top vent aperture 16 or being conducted through the aluminium body 4; and b) the ribs add mass to the top half holding the heat and radiating the heat back into the cooking chamber. This has been evidenced during trials where surfaces of the cooked food have charred quite evenly.

The invention claimed is:

1. A cooking apparatus suitable for outdoor use, said cooking apparatus comprising:
    a ellipsoid or ovoid housing which at least partially defines a cooking area within the cooking apparatus, the housing being formed from aluminium;
    one or more formations for the location and attachment of one or more skewers in use, said formations including one or more apertures and slots formed in the housing, shaped to receive one or more skewers in use; and
    wherein at least part of an inside surface of the housing includes one or more rib or baffle members located towards a top or in a top half of the housing that are linear projections located on vertical planes depending inwardly into the cooking area.

2. A cooking apparatus according to claim 1 wherein the housing is located on one or more legs or stand members such that a longitudinal axis of the apparatus and housing is positioned or located on, or aligned with, a vertical axis or plane.

3. A cooking apparatus according to claim 1 wherein a narrow or pointed end of the ellipsoid or ovoid is located at, or towards, the bottom of the cooking apparatus when the longitudinal axis of the cooking apparatus is parallel to or aligned on a vertical axis.

4. A cooking apparatus according to claim 3 wherein the cooking apparatus or housing for the cooking apparatus is symmetrical about the longitudinal axis of the cooking apparatus.

5. A cooking apparatus according to claim 1 wherein the one or more formations include one or more hooks or projections formed on or located at least partially in the housing.

6. A cooking apparatus according to claim 5 wherein the one or more formations are located on the inside surface of the housing.

7. A cooking apparatus according to claim 6 wherein said one or more formations include slots, apertures, or hooks formed on or through said housing.

8. A cooking apparatus according to claim 1 wherein the one or more formations are located in the top or towards the top of the housing such that the one or more skewers can depend downwardly towards a bottom of the apparatus in use.

9. A cooking apparatus according to claim 1 wherein the apparatus includes a first grid or mesh located towards a bottom of the apparatus on to which fuel is placed and prevents fuel from contacting the housing in use.

10. A cooking apparatus according to claim 9 wherein the first grid or mesh is located in or on a horizontal plane and prevents the fuel from contacting the bottom of the housing in use and a second mesh or grid is located above the first mesh or grid in use to prevent food from falling onto the fuel located below the first mesh or grid.

11. A cooking apparatus according to claim 10 wherein the second mesh or grid includes one or more further formations onto which at least part of the skewers can be located in use.

12. A cooking apparatus according to claim 1 wherein the housing is divided or portioned into at least a head section and a body section and the head section and the body section are engaged together in use at least whilst cooking or for storage.

13. A cooking apparatus according to claim 12 wherein the head section and the body section can be disengaged or detached to allow cleaning, removal of food, or addition/removal of fuel.

14. A cooking apparatus according to claim 12 wherein the apparatus includes a lid member located on or attached to the head section.

15. A cooking apparatus according to claim 14 wherein the rib or baffle members are located on the head section.

* * * * *